(12) United States Patent
Ogawa

(10) Patent No.: US 10,931,434 B2
(45) Date of Patent: Feb. 23, 2021

(54) RELAY APPARATUS, COMMUNICATION SYSTEM, AND FAILURE DETECTION METHOD

(71) Applicant: NEC Corporation, Tokyo (JP)

(72) Inventor: Takatoshi Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/754,691

(22) PCT Filed: Aug. 5, 2016

(86) PCT No.: PCT/JP2016/003627
§ 371 (c)(1),
(2) Date: Feb. 23, 2018

(87) PCT Pub. No.: WO2017/033416
PCT Pub. Date: Mar. 2, 2017

(65) Prior Publication Data
US 2018/0241538 A1 Aug. 23, 2018

(30) Foreign Application Priority Data
Aug. 27, 2015 (JP) .............................. JP2015-167411

(51) Int. Cl.
*H04L 7/00* (2006.01)
*H04L 12/28* (2006.01)
(Continued)

(52) U.S. Cl.
CPC .......... *H04L 7/0008* (2013.01); *H04J 3/0673* (2013.01); *H04J 3/14* (2013.01);
(Continued)

(58) Field of Classification Search
CPC ....... H04L 7/0008; H04L 69/40; H04L 12/28; H04L 69/323; H04J 3/14; H04J 3/0673; H04W 40/22; H04W 52/46; H04W 88/04
(Continued)

(56) References Cited

U.S. PATENT DOCUMENTS 9,571,216 B2 2/2017 Pallec et al.
2011/0261917 A1 10/2011 Bedrosian
(Continued)

FOREIGN PATENT DOCUMENTS

EP 2712099 A1 3/2014
JP 2013-520057 A 5/2013
(Continued)

OTHER PUBLICATIONS

Weilian Su et al., "Time-Diffusion Synchronization Protocol for Wireless Sensor Networks," IEEE/ACM Transactions on Networking, Apr. 2015, pp. 384-397, vol. 13, No. 2.
(Continued)

*Primary Examiner* — Robert C Scheibel
*Assistant Examiner* — Mohammed S Chowdhury
(74) *Attorney, Agent, or Firm* — Sughrue Mion, PLLC

(57) ABSTRACT

An object is to provide a relay apparatus capable of detecting a failure that occurs in the relay apparatus. A relay apparatus (10) according to the present disclosure includes a data reception unit (11) configured to receive a synchronizing packet transmitted from a master apparatus (20), the synchronizing packet containing a time value and a time correction value for correcting the time value, an update unit (12) configured to update the time correction value based on a processing time for the synchronizing packet, and a determination unit (13) configured to determine whether or not a failure has occurred in a functional block related to a process for updating the time correction value by using a
(Continued)

result of a comparison between a corrected time value and a reference time value, the corrected time value having been corrected by using the updated time correction value.

9 Claims, 15 Drawing Sheets

(51) Int. Cl.
    *H04J 3/14*     (2006.01)
    *H04L 29/14*     (2006.01)
    *H04J 3/06*     (2006.01)
    *H04L 29/08*     (2006.01)

(52) U.S. Cl.
    CPC .............. *H04L 12/28* (2013.01); *H04L 69/40* (2013.01); *H04L 69/323* (2013.01)

(58) Field of Classification Search
    USPC ........................................................ 370/501
    See application file for complete search history.

(56) References Cited

U.S. PATENT DOCUMENTS

| | | | |
|---|---|---|---|
| 2012/0065907 A1* | 3/2012 | Kozakai | H04J 3/0667 702/57 |
| 2012/0159001 A1 | 6/2012 | Liu et al. | |
| 2012/0224492 A1* | 9/2012 | Kitayama | H04L 12/4035 370/242 |
| 2012/0250704 A1* | 10/2012 | Yamada | H04J 3/0661 370/503 |
| 2012/0307845 A1* | 12/2012 | Le Pallec | H04J 3/0661 370/503 |
| 2013/0336341 A1* | 12/2013 | Kamada | H04J 3/0667 370/503 |
| 2014/0098706 A1* | 4/2014 | Maruyama | H04J 3/0667 370/254 |
| 2014/0348186 A1* | 11/2014 | Ogata | H04J 3/0641 370/508 |
| 2015/0215108 A1 | 7/2015 | Xu et al. | |
| 2016/0073365 A1* | 3/2016 | Klockar | H04W 56/001 370/503 |
| 2016/0094335 A1 | 3/2016 | Roberts et al. | |
| 2016/0149658 A1* | 5/2016 | Xia | H04L 41/06 370/217 |
| 2016/0259061 A1* | 9/2016 | Carter | G01S 19/05 |
| 2017/0176953 A1 | 6/2017 | Ogawa | |

FOREIGN PATENT DOCUMENTS

| | | |
|---|---|---|
| JP | 2013-168811 A | 8/2013 |
| JP | 2014-533918 A | 12/2014 |
| WO | 2014/082547 A1 | 6/2014 |
| WO | 2015122175 A1 | 8/2015 |

OTHER PUBLICATIONS

International Search Report of PCT/JP2016/003627 dated Oct. 11, 2016.

Communication dated May 30, 2018, from the European Patent Office in counterpart European Application No. 16838767.8.

\* cited by examiner

| PACKET NUMBER | INTERNAL TIME (TL) | CORRECTED TIME (TO) | TO-TL |
|---|---|---|---|
| 1 | aa:10 | aa:15 | 5 |
| 2 | aa:20 | aa:25 | 5 |
| 3 | aa:30 | aa:35 | 5 |
| ... | ... | ... | ... |

Fig. 5

| PACKET NUMBER | INTERNAL TIME (TL) | CORRECTED TIME (TO) | TO-TL |
|---|---|---|---|
| 1 | aa:10 | aa:15 | 5 |
| 2 | aa:20 | aa:40 | 20 |
| 3 | aa:30 | aa:55 | 25 |
| ... | ... | ... | ... |

Fig. 6

RELAY APPARATUS, COMMUNICATION SYSTEM, AND FAILURE DETECTION METHOD

CROSS REFERENCE TO RELATED APPLICATIONS

This application is a National Stage of International Application No. PCT/JP2016/003627 filed Aug. 5, 2016, claiming priority based on Japanese Patent Application No. 2015-167411 filed Aug. 27, 2015.

TECHNICAL FIELD

The present disclosure relates to a relay apparatus, a communication system, and a failure detection method. For example, the present disclosure relates to a relay apparatus that transmits synchronization information through a network, a communication system, and a failure detection method.

BACKGROUND ART

A GNSS (Global Navigation Satellite System) receiver receives a signal (a synchronizing signal) broadcasted from a GNSS satellite in order to obtain synchronization of time, which is necessary to use a GPS (Global Positioning System) or the like. The GNSS receiver can output a timing signal synchronized with a UTC (Coordinated Universal Time) by using the synchronizing signal broadcasted from the GNSS satellite.

Further, in some cases, in order to enable a communication apparatus located in a place where it cannot receive a synchronizing signal from a GNSS satellite to use the synchronizing signal, a GNSS receiver that has received the synchronizing signal from the GNSS satellite transmits the received synchronizing signal to the communication apparatus through a packet network.

However, the synchronizing signal that has been transmitted through the packet network involves a transmission delay. Further, transmission delay values vary due to the traffic condition or the like in the packet network. Therefore, a communication apparatus needs to use a synchronizing signal while giving consideration to a transmission delay caused in a packet network.

Note that in an IEEE1588v2 (IEEE1588-2008) network which is specified to perform phase synchronization using packet data (a synchronizing packet), it is specified that a Transparent Clock apparatus is used to reduce transmission delays caused in transmission apparatuses and relay apparatuses which constitute the network. The Transparent Clock apparatus writes a duration for which an incoming synchronizing packet has remained in the Transparent Clock apparatus into a correction field of that synchronizing packet and then transmits the synchronizing packet in which the correction field has been updated to a communication apparatus. The synchronizing packet is, for example, a PTP Packet specified in the IEEE1588-2008. Further, the correction field is, for example, a correctionField specified in the IEEE1588-2008.

Patent Literature 1 discloses that in a communication system in which a relay apparatus is disposed between a communication apparatus on a transmitting side and a communication apparatus on a receiving side, the communication apparatuses on the transmitting and receiving sides synchronize their times with each other. Specifically, the communication apparatus on the transmitting side transmits data in which a transmitting time and a delay time of a transmission line to the relay apparatus are set to the relay apparatus. Further, the relay apparatus transmits data in which a delay time of a transmission line to the communication apparatus on the receiving side is set to the communication apparatus on the receiving side. The communication apparatus on the receiving side synchronizes its time by using the time information and the transmission-line delay times set in the received data.

CITATION LIST

Patent Literature

Patent Literature 1: Japanese Unexamined Patent Application Publication No. 2013-168811

SUMMARY OF INVENTION

Technical Problem

When a failure has occurred in the relay apparatus disclosed in Patent Literature 1, an appropriate transmission-line delay time or the like may not be set in data that is transmitted from the relay apparatus to the communication apparatus on the receiving side. That is, in the case where the communication apparatuses on the transmitting and receiving sides synchronize their times with each other in a state in which a failure has occurred in the relay apparatus, when the communication apparatus on the receiving side receives data in which an accurate transmission-line delay time or the like is not set, it cannot perform a normal time synchronizing process.

However, Patent Literature 1 does not disclose any operation for detecting a failure in the relay apparatus even when the failure has occurred inside the apparatus. Therefore, there is a problem that when a failure has occurred in the relay apparatus, the communication apparatus on the receiving side continues an incorrect time synchronizing process.

An object of the present disclosure is to provide a relay apparatus, a communication system, and a failure detection method capable of detecting a failure that occurs in the relay apparatus.

Solution to Problem

A relay apparatus according to a first aspect of the present disclosure includes: a data reception unit configured to receive a synchronizing packet transmitted from a master apparatus, the synchronizing packet containing a time value and a time correction value for correcting the time value; an update unit configured to update the time correction value based on a processing time for the synchronizing packet; and a determination unit configured to determine whether or not a failure has occurred in a functional block related to a process for updating the time correction value by using a result of a comparison between a corrected time value and a reference time value, the corrected time value having been corrected by using the updated time correction value.

A communication system according to a second aspect of the present disclosure includes: a master apparatus configured to transmit a synchronizing packet containing a time value and a time correction value for correcting the time value; a secondary apparatus configured to reproduce a time value synchronized with the time value indicated by the master apparatus by using the synchronizing packet; and a relay apparatus configured to relay the synchronizing packet transmitted/received between the master apparatus and the secondary apparatus, in which the relay apparatus includes: a data reception unit configured to receive the synchronizing packet transmitted from the master apparatus; an update unit configured to update the time correction value based on a processing time for the synchronizing packet; and a determination unit configured to determine whether or not a failure has occurred in a functional block related to a process for updating the time correction value by using a result of a comparison between a corrected time value and a reference time value, the corrected time value having been corrected by using the updated time correction value.

A failure detection method according to a third aspect of the present disclosure includes: receiving a synchronizing packet transmitted from a master apparatus, the synchronizing packet containing a time value and a time correction value for correcting the time value; updating the time correction value based on a processing time for the synchronizing packet; and determining whether or not a failure has occurred in a functional block related to a process for updating the time correction value by using a result of a comparison between a corrected time value and a reference time value, the corrected time value having been corrected by using the updated time correction value.

Advantageous Effects of Invention

According to the present disclosure, it is possible to provide a relay apparatus, a communication system, and a failure detection method capable of detecting a failure that occurs in the relay apparatus.

BRIEF DESCRIPTION OF DRAWINGS

FIG. 5 is a table showing information managed by a determination unit according to the second embodiment;

FIG. 6 is a table showing information managed by a determination unit according to the second embodiment;

DESCRIPTION OF EMBODIMENTS

First Embodiment

Figure 1:
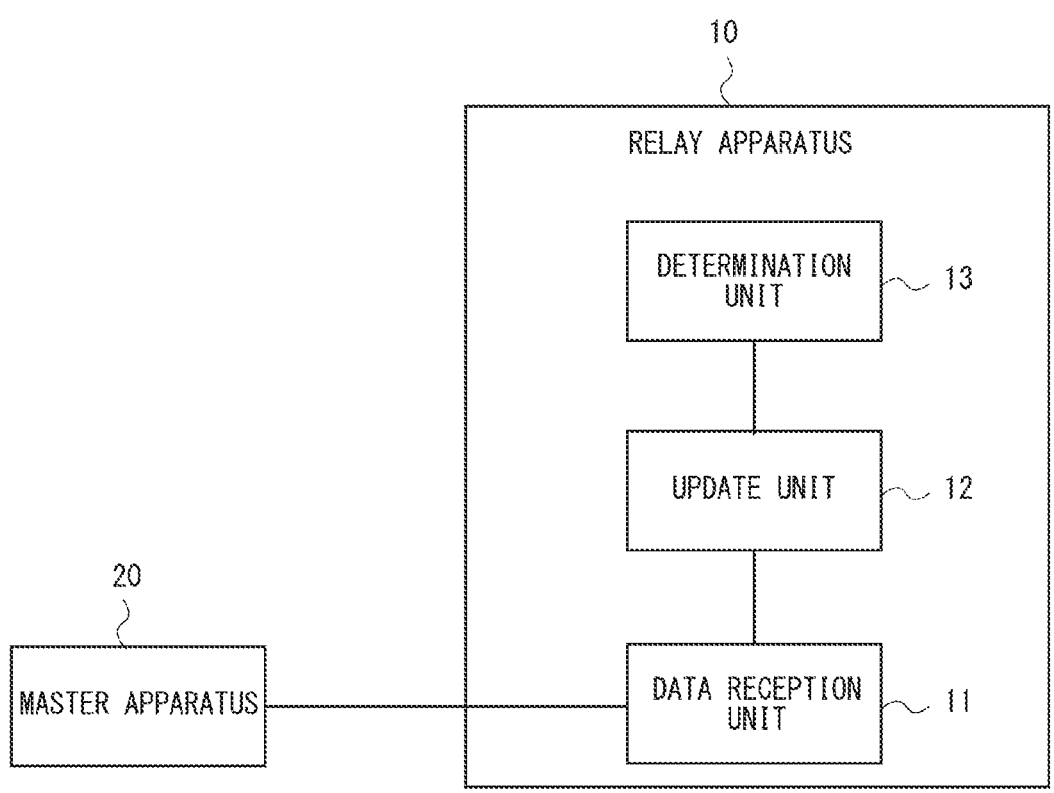
FIG. 1 is a configuration diagram of a relay apparatus according to a first embodiment.

Embodiments according to the present disclosure are explained with reference to the drawings. A configuration example of a relay apparatus 10 according to a first embodiment of the present disclosure is explained with reference to FIG. 1. The relay apparatus 10 may be a computer apparatus that operates by having a processor execute a program stored in a memory.

The relay apparatus 10 includes a data reception unit 11, an update unit 12, and a determination unit 13. Each of the components constituting the relay apparatus 10 may be software, a module, or the like that operates by having a processor execute a program stored in a memory. Alternatively, each of the components constituting the relay apparatus 10 may be hardware such as a chip or a circuit.

The data reception unit 11 receives a synchronizing packet transmitted from a master apparatus 20. The synchronizing packet contains a time value and a time correction value for correcting the time value. When IEEE1588-2008, for example, is applied to the relay apparatus 10, the time value is a Timestamp or an originTimestamp specified in the IEEE1588-2008. Further, when the IEEE1588-2008, for example, is applied to the relay apparatus 10, the time correction value is a value set in the correctionField.

The master apparatus 20 may be a computer apparatus that operates by having a processor execute a program stored in a memory. The data reception unit 11 may receive a synchronizing packet transmitted from the master apparatus 20 through a network. The data reception unit 11 outputs the received synchronizing packet to the update unit 12.

The update unit 12 updates the time correction value based on a processing time for the synchronizing packet output from the data reception unit 11. The synchronizing packet is transmitted to other devices or the like after undergoing packet processing performed in the relay apparatus 10. Therefore, for example, the update unit 12 may update the time correction value, which has been set in the synchronizing packet transmitted from the master apparatus 20, by adding a packet processing time in the relay apparatus 10 to that time correction value. The update unit 12 outputs the synchronizing packet in which the time correction value has been updated to the determination unit 13.

The determination unit 13 determines whether or not a failure has occurred in a functional block related to the process for updating the time correction value by using a result of a comparison between a corrected time value, which has been corrected by using the updated time correction value, and a reference time value. When the IEEE1588-2008, for example, is applied to the relay apparatus 10, the reference time value is a local time specified in the IEEE1588-2008.

The corrected time value, which has been corrected by using the updated time correction value, is, for example, a value obtained by correcting the time value contained in the synchronizing packet transmitted from the master apparatus 20 by using the updated time correction value.

The reference time value may be, for example, a time value output from a clock device provided in the relay apparatus 10 or a time value or the like transmitted from a clock device disposed outside the relay apparatus 10.

The determination unit 13 may determine that the process for updating the time correction value has been properly performed in the relay apparatus 10 when temporal progress of the corrected time value, which has been corrected by using the updated time correction value, (hereinafter referred to as the corrected time value) is substantially equal to temporal progress of the reference time value based on a comparison between the corrected time value and the reference time value. Further, the determination unit 13 may determine that the process for updating the time correction value has not been properly performed in the relay apparatus 10 when the temporal progress of the corrected time value differs from the temporal progress of the reference time value. The temporal progress may mean, for example, a lapse of time.

In this specification, the fact that the process for updating the time correction value has not been properly performed in the relay apparatus 10 means that a failure has occurred in a functional block related to the process for updating the time correction value. Note that the determination unit 13 shown in FIG. 1 may function as a verification unit that verifies whether or not the time correction value is normal. For example, the determination unit 13 verifies the normality of the time correction value by using a result of a comparison between the corrected time value and the reference time value. For example, the determination unit 13 may determine that the time correction value is normal when the temporal progress of the corrected time value is substantially equal to that of the reference time value, and determine that the time correction value is not normal when the temporal progress of the corrected time value is not substantially equal to that of the reference time value.

As explained above, the relay apparatus 10 according to the first embodiment of the present disclosure can determine whether or not the process for updating the time correction value has been properly performed in the relay apparatus 10 itself by comparing the corrected time value with the reference time value.

By making it possible to detect a failure in the relay apparatus 10, it is possible to determine whether or not the time synchronization, which has been performed by using the synchronizing packet transmitted from the relay apparatus 10, has been accurately performed. Further, by making it possible to detect a failure in the relay apparatus 10, it is possible to repair the relay apparatus 10, use other relay apparatuses, or take other countermeasures.

Second Embodiment

Figure 2:
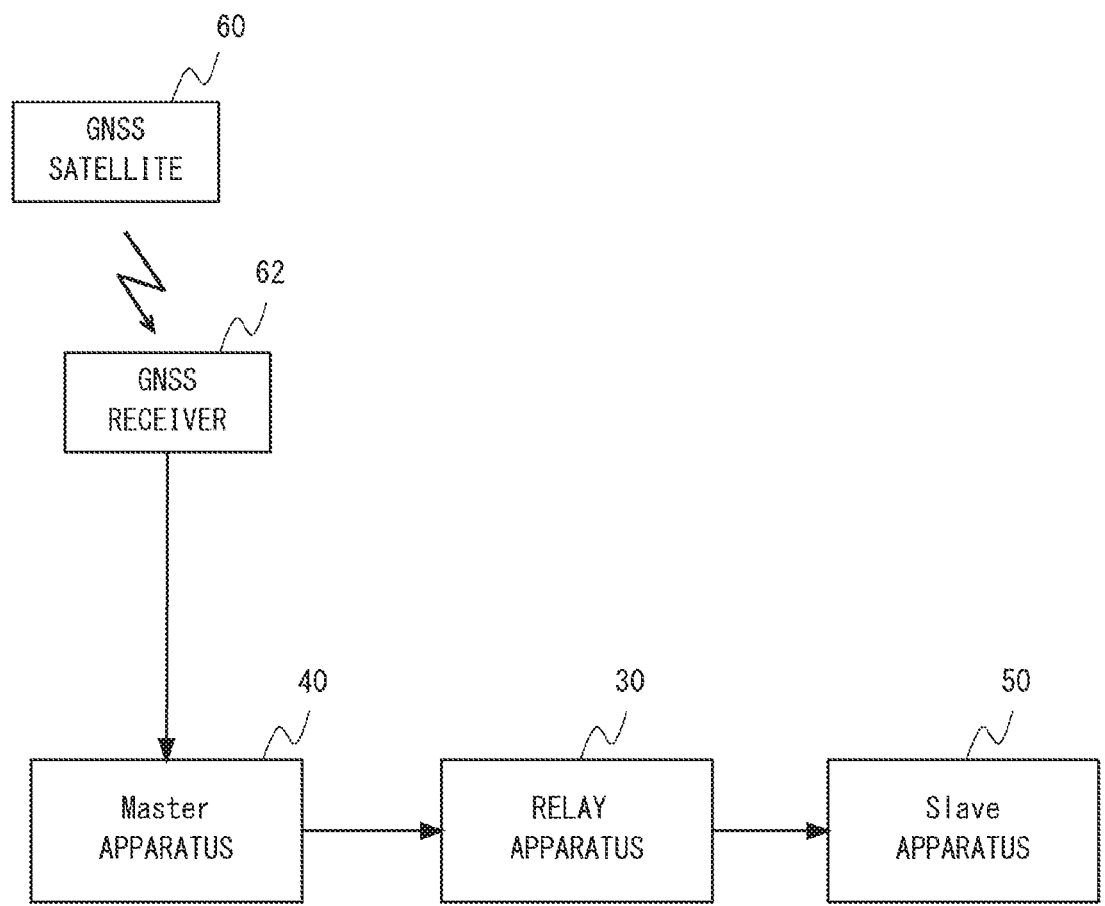
FIG. 2 is a configuration diagram of a communication system according to a second embodiment.

Next, a configuration example of a communication system according to a second embodiment of the present disclosure is explained with reference to FIG. 2. A communication system shown in the figure includes a GNSS satellite 60, a GNSS receiver 62, a Master apparatus 40, a relay apparatus 30, and a Slave apparatus 50.

The GNSS satellite 60 transmits a GNSS broadcast signal synchronized with a UTC. Further, the term GNSS is a general term for satellite positioning systems including GPS, GLONASS, Galileo, Compass, Quasi-Zenith Satellite System (QZSS), etc. The GNSS receiver 62 receives a GNSS broadcast signal transmitted from the GNSS satellite 60. The GNSS receiver 62 reproduces a synchronizing signal based on the GNSS broadcast signal and transmits the reproduced synchronizing signal to the Master apparatus 40. Alternatively, the function in the GNSS receiver 62 and the function in the Master apparatus 40 may be incorporated in the same apparatus.

The Master apparatus 40 transmits a synchronizing packet to the Slave apparatus 50 through the relay apparatus 30. The synchronizing packet is, for example, a clock signal generated by using the GNSS broadcast signal. Note that the Master apparatus 40 transmits a synchronizing signal by using, for example, a method specified in IEEE1588 (hereinafter called IEEE1588 transmission) or a Synchronous Ethernet (Registered Trademark) method (hereinafter called a SyncE method). The IEEE1588 transmission and the SyncE transmission are performed through an Ethernet (Registered Trademark). Further, the IEEE1588 may also be referred to as a PTP (Precision Time Protocol). The method specified in the IEEE1588 includes, for example, updated versions such as IEEE1588Version2 (IEEE1588v2).

The relay apparatus 30 is, for example, an apparatus that is disposed in a packet network and transmits packet data through an Ethernet or a radio communication network. The figure shows a configuration in which one relay apparatus 30 is disposed in a packet network between the Master apparatus 40 and the Slave apparatus 50. However, a plurality of relay apparatuses 30 may be disposed in the packet network between the Master apparatus 40 and the Slave apparatus 50.

The relay apparatus 30 receives a synchronizing packet transmitted from the Master apparatus 40. Further, the relay apparatus 30 incorporates a data processing time in the relay apparatus 30 itself into a time correction field of the synchronizing packet. That is, the relay apparatus 30 updates the time correction field of the synchronizing packet. The relay apparatus 30 transmits the synchronizing packet in which the time correction field has been updated to the Slave apparatus 50. In the case in which a plurality of relay apparatuses are disposed in the packet network, the relay apparatus 30 may receive a synchronizing packet transmitted from other relay apparatuses. Further, the relay apparatus 30 may transmit an updated synchronizing packet to other relay apparatuses.

The Slave apparatus 50 receives the synchronizing packet which has been transmitted through the relay apparatus 30. Further, the Slave apparatus 50 generates synchronized time information that is in synchronization with time information generated by the GNSS receiver 62, the Master apparatus 40, or the like by using the received synchronizing packet. For the generation of the synchronized time information, the above-described method specified in the IEEE1588 or the like may be used. Alternatively, other methods may be used.

Figure 3:
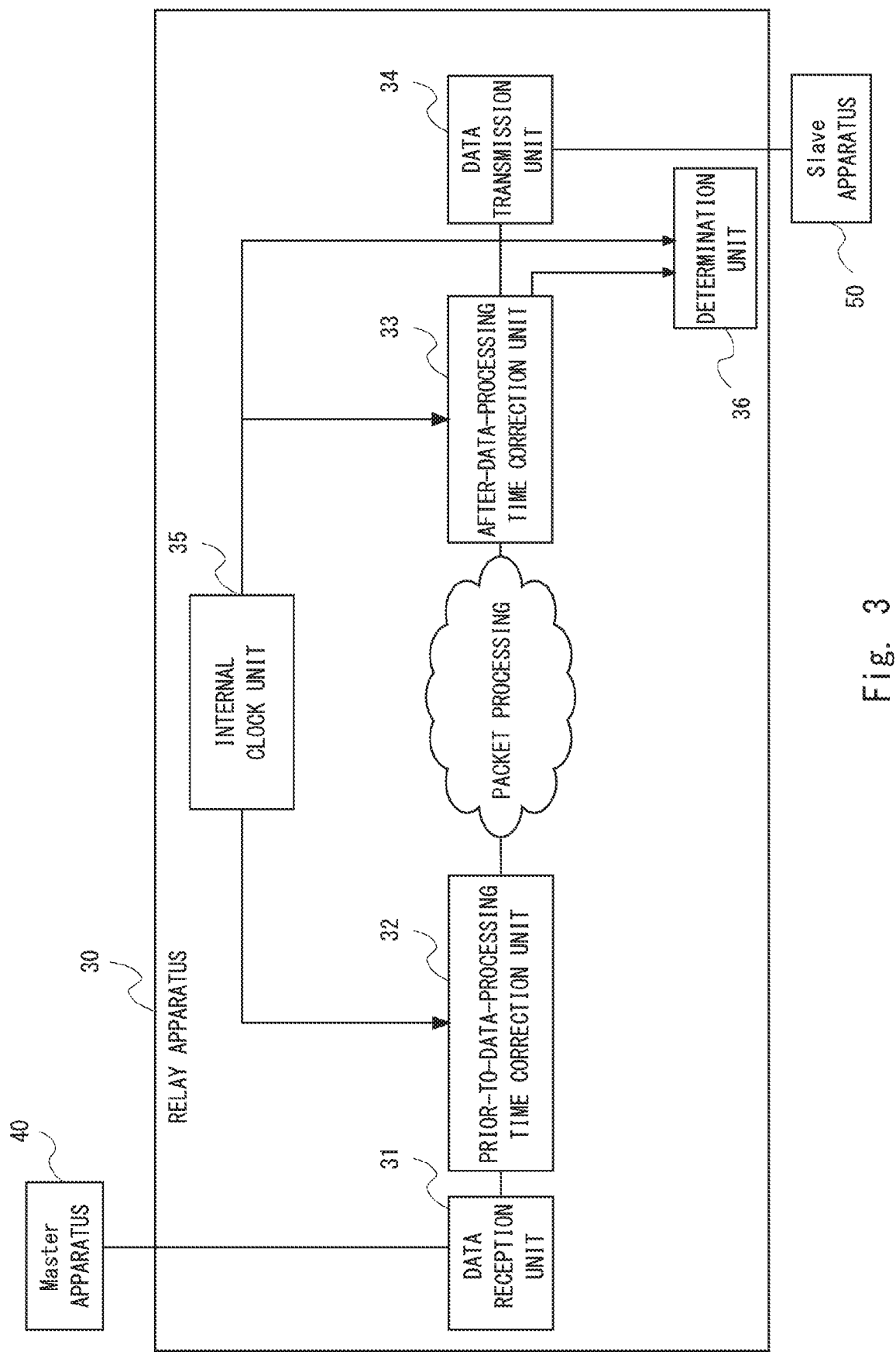
FIG. 3 is a configuration diagram of a relay apparatus according to the second embodiment.

Next, a configuration example of the relay apparatus 30 according to the second embodiment of the present disclosure is explained with reference to FIG. 3. The relay apparatus 30 includes a data reception unit 31, a prior-to-data-processing time correction unit 32, an after-data-processing time correction unit 33, a data transmission unit 34, an internal clock unit 35, and a determination unit 36. The data reception unit 31 corresponds to the data reception unit 11 shown in FIG. 1. The prior-to-data-processing time correction unit 32 and the after-data-processing time correction unit 33 correspond to the update unit 12 shown in FIG. 1. The determination unit 36 corresponds to the determination unit 13 shown in FIG. 1.

The data reception unit 31 receives a synchronizing packet transmitted from the Master apparatus 40. For example, the data reception unit 31 receives a synchronizing packet transmitted from the Master apparatus 40 through a packet network. At least one relay apparatus may be disposed between the Master apparatus 40 and the data reception unit 31. That is, the data reception unit 31 may receive a synchronizing packet transmitted from the Master apparatus 40 without any intervention by a relay apparatus or the like disposed in the network, or may receive a synchronizing packet transmitted through a plurality of relay apparatuses or the like disposed in the network. The data reception unit 31 outputs the received synchronizing packet to the prior-to-data-processing time correction unit 32.

Figure 4:
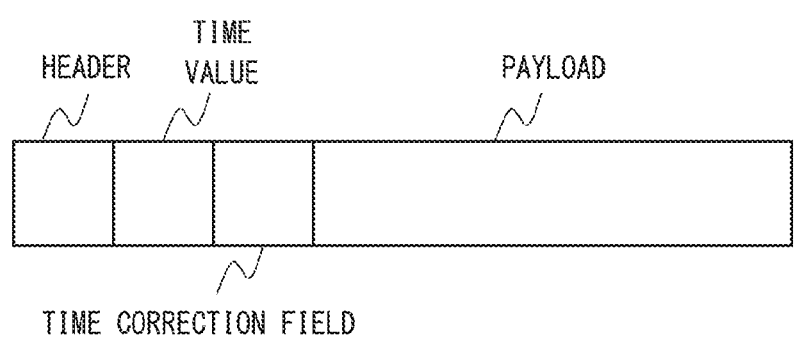
FIG. 4 is a structure diagram of a synchronizing packet according to the second embodiment.

An example of a structure of a synchronizing packet is explained hereinafter with reference to FIG. 4. A synchronizing packet that the Master apparatus 40 transmits to the relay apparatus 30 contains a header, a payload, a time field, and a time correction field. The header and the payload are the same as those in a commonly-used frame or a commonly-used packet and therefore there detailed explanations are omitted. The time field and the time correction field may be defined as a part of the header, or may be defined as a part of ordinary data in the payload.

In the time field, for example, a time value indicating a time at which the Master apparatus 40 transmits the synchronizing packet is set. Further, in the time correction field, for example, a time correction value for correcting the time value for a transmission delay of the synchronizing packet caused in the packet network, a processing delay thereof caused in each relay apparatus, and the like is set.

Referring FIG. 3 again, the prior-to-data-processing time correction unit 32 extracts the time correction value set in the time correction field of the synchronizing packet. The prior-to-data-processing time correction unit 32 subtracts information indicating a time at which the synchronizing packet is received from the extracted time correction value and thereby updates the time correction field. The time at which the synchronizing packet is received may be, for example, a time at which the prior-to-data-processing time correction unit 32 receives the synchronizing packet from the data reception unit 31.

The prior-to-data-processing time correction unit 32 outputs the synchronizing packet in which the time correction field has been updated to a circuit, a functional block, or the like that performs data processing. The functional block is, for example, a function by which processing is performed by having a processor execute a program. For example, the functional block may be a packet switch function or the like. The circuit, the functional block, or the like that performs data processing may be, for example, a process for controlling a transmission line or the like of a synchronizing packet in the packet network, or may be a process for information set in other packet layers or a process for information set in a layer higher than the packet layer. The data processing may be, for example, referred to as packet processing.

The synchronizing packet, for which data processing has been performed in the circuit or the like that performs data processing, is output to the after-data-processing time correction unit 33. The after-data-processing time correction unit 33 extracts the time correction value set in the time correction field of the output synchronizing packet. The after-data-processing time correction unit 33 updates the time correction field by adding information indicating a time that is later than the execution of the data processing for the synchronizing packet to the extracted time correction value.

The time later than the execution of the data processing for the synchronizing packet may be, for example, a time at which the after-data-processing time correction unit 33 receives the synchronizing packet for which the data processing has been performed.

The after-data-processing time correction unit 33 outputs the synchronizing packet in which the time correction field has been updated to the data transmission unit 34 and the determination unit 36. The data transmission unit 34 transmits the synchronizing packet output from the after-data-processing time correction unit 33 to the Slave apparatus 50.

For example, the data transmission unit 34 transmits the synchronizing packet to the Slave apparatus 50 through the packet network. At least one relay apparatus may be disposed between the data transmission unit 34 and the Slave apparatus 50. That is, the Slave apparatus 50 may receive a synchronizing packet transmitted from the data transmission unit 34 without any intervention by a relay apparatus disposed in the network, or may receive a synchronizing packet transmitted through a plurality of relay apparatuses or the like disposed in the network.

The internal clock unit 35 generates a clock signal that is used in a circuit, a functional block, and the like disposed in the relay apparatus 30. The internal clock unit 35 may be, for example, an oscillator. For example, the internal clock unit 35 outputs the clock signal to the prior-to-data-processing time correction unit 32, the after-data-processing time correction unit 33, and the determination unit 36. The prior-to-data-processing time correction unit 32, the after-data-processing time correction unit 33, and the determination unit 36 can recognize the current time by using the clock signal output from the internal clock unit 35.

For example, the internal clock unit 35 outputs a clock signal in which a counter value is set to the prior-to-data-processing time correction unit 32, the after-data-processing time correction unit 33, and the determination unit 36. A counter value that increases according to the lapse of time is set in the clock signal. In this case, the prior-to-data-processing time correction unit 32 subtracts a counter value indicating the current time from a counter value set in a time correction field of a synchronizing signal output from the data reception unit 31. For example, when the counter value indicating the current time is Ta, the prior-to-data-processing time correction unit 32 sets a value −Ta in the time correction field.

When the after-data-processing time correction unit 33 receives the synchronizing packet, for which the packet processing has been performed, it adds the counter value indicating the current time to the counter value set in the time correction field. For example, when the counter value indicating the current time is Tb, the after-data-processing time correction unit 33 sets a value expressed by "−Ta+Tb" in the time correction field. Note that it is assumed that a value −Ta had been set in the time correction field. The value "Tb−Ta" indicates a packet processing time. That is, the packet processing time for the synchronizing packet in the relay apparatus 30 is set in the time correction field of that synchronizing packet. The value "−Ta+Tb" set in the time correction field of the synchronizing packet is referred to as a time correction value.

In some cases, the relay apparatus 30 receives a synchronizing packet in which a time correction field has been updated from other relay apparatuses. It is assumed that, in such cases, a time correction value Tn calculated in the other relay apparatus has been set in the time correction field. When the time correction value Tn is set in the time correction field, the prior-to-data-processing time correction unit 32 changes the value set in the time correction field to a value "Tn−Ta". Further, when the after-data-processing time correction unit 33 receives the synchronizing packet in which the value "Tn−Ta" is set in the time correction field, it changes the value in the time correction field to a value "Tn−Ta+Tb".

In the above explanation, an example in which the prior-to-data-processing time correction unit 32 subtracts a value Ta from a value set in the time correction field is shown. Further, the prior-to-data-processing time correction unit 32 may add a delay time Dx indicating a difference between a time at which the prior-to-data-processing time correction unit 32 receives the synchronizing packet and a time at which the data reception unit 31 receives the synchronizing packet to the value of the time correction field. That is, the delay time Dx indicates a transmission delay that is caused when the synchronizing packet is transmitted from the data reception unit 31 to the prior-to-data-processing time correction unit 32.

The delay time Dx is a value intrinsic to the relay apparatus 30 and is a fixed value that is unchanged for different synchronizing packets. Therefore, the prior-to-data-processing time correction unit 32 may add a delay time Dx that is stored therein in advance to the value of the time correction field. That is, the prior-to-data-processing time correction unit 32 may add a value "Dx−Ta" to the value of the time correction field. In the case in which the prior-to-data-processing time correction unit 32 does not store the delay time Dx in advance, every time the prior-to-data-processing time correction unit 32 receives a synchronizing packet, it may calculate a transmission delay that is caused when the synchronizing packet is transmitted from the data reception unit 31 to the prior-to-data-processing time correction unit 32.

The after-data-processing time correction unit 33 may add a delay time Dy indicating a transmission delay between the after-data-processing time correction unit 33 and the data transmission unit 34 to the value of the time correction field. For example, the delay time Dy may be a time indicating a difference between a time at which the after-data-processing time correction unit 33 outputs a synchronizing packet and a time at which the data transmission unit 34 transmits that synchronizing packet to other relay apparatuses or to the Slave apparatus 50

Similarly to the delay time Dx, the delay time Dy is a value intrinsic to the relay apparatus 30 and is a fixed value that is unchanged for different synchronizing packets. Therefore, the after-data-processing time correction unit 33 may add a delay time Dy that is stored therein in advance to the value of the time correction field. That is, the prior-to-data-processing time correction unit 32 may add a value "Dy+Tb" to the value of the time correction field. In other words, a value "Dx−Ta+Dy+Tb" is set in the time correction field. As the relay apparatus 30 adds the values Dx and Dy to the value of the time correction field, the packet processing time in the relay apparatus 30 and the transmission delay in the apparatus are incorporated into the time correction field.

The Slave apparatus 50 can use the value "Dx−Ta+Dy+Tb" set in the time correction field of the synchronizing packet received from the relay apparatus 30 as a packet processing time or a data processing time in the relay apparatus 30 and thereby correct the synchronized time information.

The determination unit 36 generates an internal time value by using the clock signal output from the internal clock unit 35. The internal time value is a time value that is used in each functional block in the relay apparatus 30, which has received the clock signal output from the internal clock unit 35, in a synchronous manner. Further, the determination unit 36 corrects the time value set in the time field of the synchronizing packet output from the after-data-processing time correction unit 33 by using the time correction value set in the time correction field of the synchronizing packet.

Further, the determination unit 36 manages the internal time value indicating the time at which the synchronizing packet is received and the time value which has been corrected by using the time correction value while associating them with each other. The determination unit 36 determines whether or not a failure has occurred in a functional block related to a process for updating the time correction value. Specifically, the determination unit 36 determines whether or not a failure has occurred in the prior-to-data-processing time correction unit 32, the after-data-processing time correction unit 33, and a circuit or a functional block that performs packet processing for the synchronizing packet. The information managed by the determination unit 36 is explained hereinafter with reference to FIG. 5.

The packet number in FIG. 5 indicates an order in which the determination unit 36 has received synchronizing packets output from the after-data-processing time correction unit 33. The internal time (TL) indicates times at which the synchronizing packets are received. The corrected time (TO) indicates times that are obtained by correcting time values (Ti) set in time fields of synchronizing packets by using time correction values set in time correction fields of the synchronizing packets. For example, a corrected time TO may be expressed as "TO=Ti+(−Ta+Tb)" or "TO=Ti+(Dx−Ta+Dy+Tb)". The value "TO−TL" indicates a difference between the corrected time value and the internal time value.

Next, a determination process performed by the determination unit 36 is explained. For example, the determination unit 36 may determine whether or not temporal progress of the corrected time value is substantially equal to temporal progress of the internal time value by comparing the value "TO−TL" with a threshold.

For example, the determination unit 36 may define an upper limit threshold as 10 and define a lower limit threshold as 2. In this case, the determination unit 36 determines whether or not the value "TO−TL" satisfies a conditional expression. For example, the determination unit 36 may determine that the temporal progress of the corrected time value is substantially equal to that of the internal time value when the value "TO−TL" satisfies a condition "(TO−TL<Upper limit value: 10) and (TO−TL>Lower limit value: 2)".

In the example shown in FIG. 5, since all of the values "TO−TL" satisfy the conditional expression, the determination unit 36 determines that the temporal progress of the corrected time values is substantially equal to that of the internal time values. That is, the determination unit 36 determines that no failure has occurred in the prior-to-data-processing time correction unit 32, the after-data-processing time correction unit 33, and the circuit or the functional block that performs packet processing for synchronizing packets.

Next, a determination process performed by the determination unit 36 is explained by using information shown in FIG. 6. The value "TO−TL" for the packet number 1 shown in FIG. 6 satisfies the conditional expression. However, regarding the packet number 2, the value "TO−TL" is larger than the upper limit value 10 (TO−TL>Upper limit value: 10). Further, the value "TO−TL" for the packet number 3 is also larger than the upper limit value 10 (TO−TL>Upper limit value: 10). Therefore, the values "TO−TL" for the packet numbers 2 and 3 do not satisfy the conditional expression. Accordingly, since the temporal progress of the corrected time values is not substantially equal to that of the internal time values, the determination unit 36 determines that a failure has occurred in at least one of the prior-to-data-processing time correction unit 32, the after-data-processing time correction unit 33, and the circuit or the functional block that performs packet processing for synchronizing packets.

In the above explanation, the determination unit 36 determines whether or not temporal progress of the corrected time value is substantially equal to that of the internal time value by using the value "TO−TL". However, the determination unit 36 may perform a determination process by using a value other than the value "TO−TL".

For example, the determination unit 36 may determine whether a value calculated by "(TO for packet number 2)−(TO for packet number 1)" is equal to a value calculated by "(TL for packet number 2)−(TL for packet number 1)", or whether it falls within a predetermined threshold range. That is, the determination unit 36 may determine whether or not temporal progress of the corrected time value is substantially equal to that of the internal time value by using a difference between internal times TL of packets that are received at different timings and a difference between corrected times TL of these packets.

Figure 7:
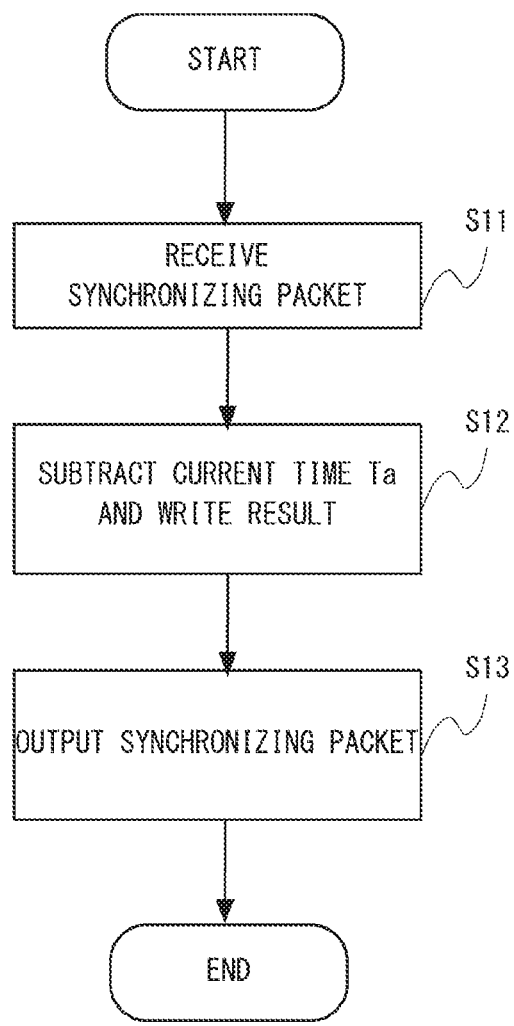
FIG. 7 shows a flow of a time correction field update process performed in an after-data-processing time correction unit according to the second embodiment.

Next, a flow of a process for updating a time correction field in the prior-to-data-processing time correction unit 32 according to the second embodiment of the present disclosure is explained with reference to FIG. 7. Firstly, the prior-to-data-processing time correction unit 32 receives a synchronizing packet output from the data reception unit 31 (S11).

Next, the prior-to-data-processing time correction unit 32 subtracts a time Ta indicating the current time from a value set in the time correction field of the synchronizing packet (S12). When no value is set in the time correction field, the prior-to-data-processing time correction unit 32 sets a value −Ta in the time correction field, whereas when a value Tn is already set in the time correction field, the prior-to-data-processing time correction unit 32 sets a value "Tn−Ta" in the time correction field.

Next, the prior-to-data-processing time correction unit 32 outputs the synchronizing packet, in which the time correction field has been updated, to a circuit or a functional block that performs packet processing for the synchronizing packet (S13).

When the prior-to-data-processing time correction unit 32 subtracts the time Ta in the step S12, it may add a delay time Dx in addition to the subtraction.

Figure 8:
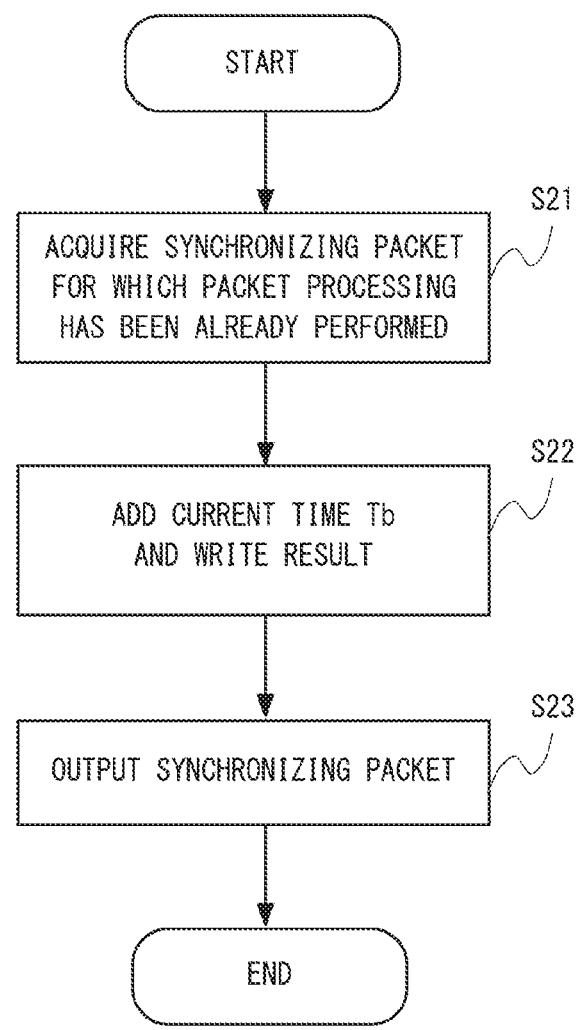
FIG. 8 shows a flow of a time correction field update process performed in a prior-to-data-processing time correction unit according to the second embodiment.

Next, a flow of a process for updating a time correction field in the after-data-processing time correction unit 33 according to the second embodiment of the present disclosure is explained with reference to FIG. 8. Firstly, the after-data-processing time correction unit 33 acquires a synchronizing packet for which packet processing has already been performed (S21).

Next, the after-data-processing time correction unit 33 adds a time Tb indicating the current time to a value set in the time correction field of the synchronizing packet (S22). As the after-data-processing time correction unit 33 adds the time Tb, a value "−Ta+Tb" or a value "Tn−Ta+Tb", for example, may be set in the time correction field.

The after-data-processing time correction unit 33 outputs the synchronizing packet, in which the time correction field has been updated, to the data transmission unit 34 and the determination unit 36 (S23).

When the after-data-processing time correction unit 23 adds the time Tb in the step S22, it may add a delay time Dy, too.

Figure 9:
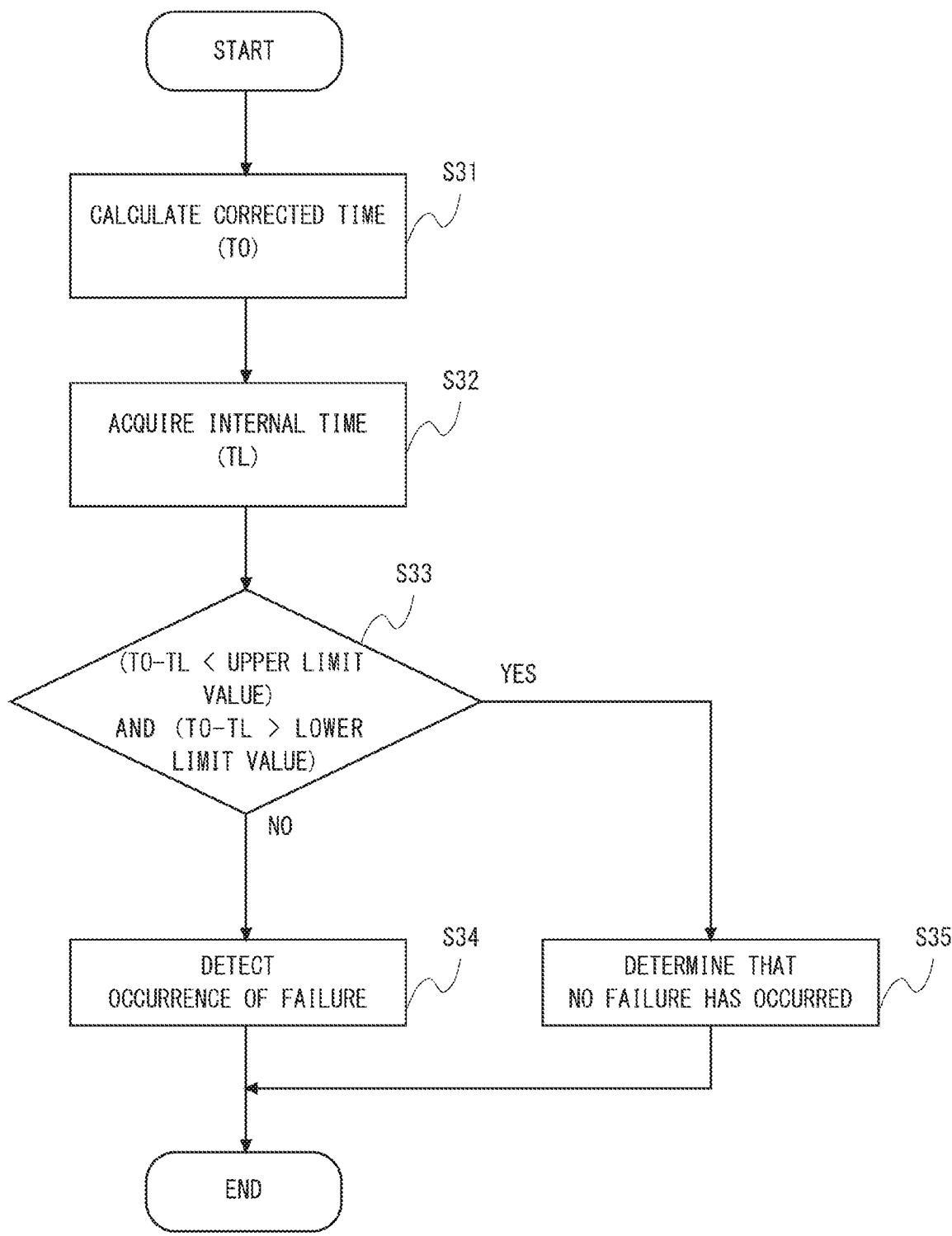
FIG. 9 shows a flow of a determination process performed in a determination unit according to the second embodiment.

Next, a flow of a determination process in the determination unit 36 according to the second embodiment of the present disclosure is explained with reference to FIG. 9. Firstly, the determination unit 36 acquires a synchronizing packet for which packet processing has already been performed and calculates a corrected time (TO) (S31). Next, the determination unit 36 acquires an internal time (TL) indicating a timing at which the synchronizing packet is acquired (S32). Note that although FIG. 9 shows that the step S32 is performed after the step S31, the steps S31 and S32 may be simultaneously performed in practice.

Next the determination unit 36 determines whether or not a condition "Lower limit threshold<TO−TL<Upper limit threshold" is satisfied (S33). When the determination unit 36 determines that the value "TO−TL" does not satisfy the condition "Lower limit threshold<TO−TL<Upper limit threshold", it determines that a failure has occurred in at least one of the prior-to-data-processing time correction unit 32, the after-data-processing time correction unit 33, and the circuit or the functional block that performs packet processing for the synchronizing packet (S34). When the determination unit 36 determines that the value "TO−TL" satisfies the condition "Lower limit threshold<TO−TL<Upper limit threshold", it determines that no failure has occurred in the prior-to-data-processing time correction unit 32, the after-data-processing time correction unit 33, and the circuit or the functional block that performs packet processing for the synchronizing packet (S35).

As explained above, the relay apparatus 30 according to the second embodiment of the present disclosure can determine whether or not a failure has occurred in at least one of the prior-to-data-processing time correction unit 32, the after-data-processing time correction unit 33, and the circuit or the functional block that performs packet processing for synchronizing packets.

Further, in the step S34, the determination unit 3 may detect an occurrence of a failure when the determination unit 36 determines that the condition "Lower limit threshold<TO−TL<Upper limit threshold" is not satisfied for a predetermined number of synchronizing packets or larger.

Further, the relay apparatus 30 may transmit a result of the determination in the determination unit 36 to an apparatus other than the relay apparatus 30. An example of the apparatus other than the relay apparatus 30 may be an apparatus that monitors the whole network such as a network management apparatus. Alternatively, the relay apparatus 30 may display the result of the determination in the determination unit 36 in a display unit such as a liquid-crystal screen (not shown) provided in the relay apparatus 30, or output a sound indicating the determination result.

Third Embodiment

Figure 10:
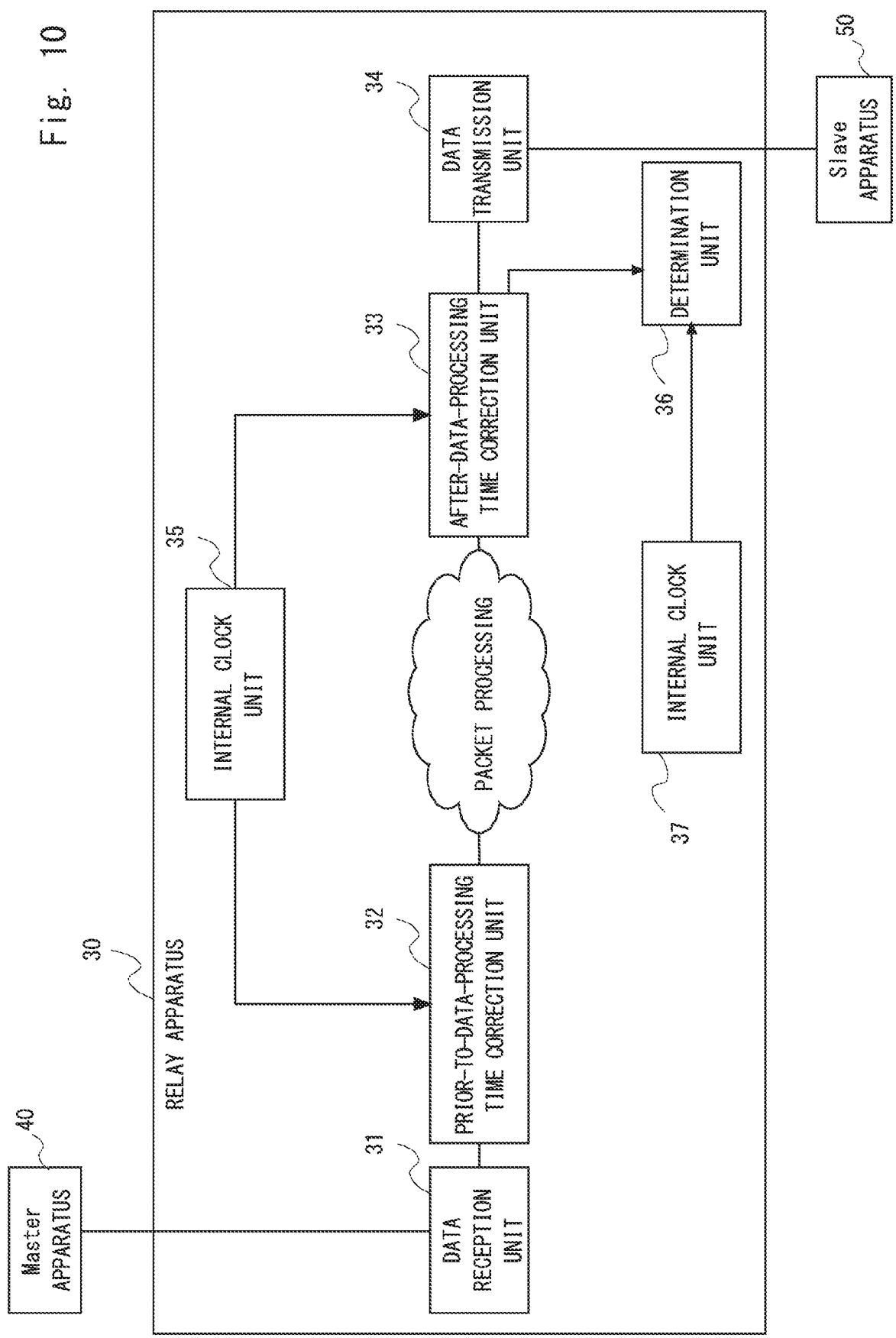
FIG. 10 is a configuration diagram of a relay apparatus according to a third embodiment.

Next, a configuration example of a relay apparatus 30 according to a third embodiment of the present disclosure is explained with reference to FIG. 10. The relay apparatus 30 shown in FIG. 10 includes an additional internal clock unit 37 compared to the relay apparatus 30 shown in FIG. 3. Detailed explanations of components of the relay apparatus 30 shown in FIG. 10 that are similar to those of the relay apparatus 30 shown in FIG. 3 are omitted.

The internal clock unit 37 outputs a clock signal different from the clock signal output by the internal clock unit 35. In other words, the internal clock unit 37 operates independently of the internal clock unit 35. The internal clock unit 37 outputs the clock signal to the determination unit 36. The determination unit 36 generates an internal time value at which it receives a synchronizing packet output from the after-data-processing time correction unit 33 by using the clock signal output from the internal clock unit 37.

The determination unit 36 calculates a corrected time (TO) by using the synchronizing packet in which a time correction value has been updated based on the clock signal output from the internal clock unit 35. Further, the determination unit 36 calculates an internal time (TL) by using the clock signal output from the internal clock unit 37.

When a value "TO−TL" does not satisfy a conditional expression "Lower limit threshold<TO−TL<Upper limit threshold", the determination unit 36 can determine that there is a possibility that a failure has occurred in the internal clock unit 35, in addition to in the prior-to-data-processing time correction unit 32, the after-data-processing time correction unit 33, and the circuit or the functional block that performs packet processing for synchronizing packets. However, this determination is made on the assumption that the internal clock unit 37 is properly operating.

As explained above, the determination unit 36 of the relay apparatus 30 according to the third embodiment of the present disclosure can calculate an internal time value by using a clock signal different from the clock signal used for the updating of the time correction value. In this way, the determination unit 36 can determine that there is a possibility that a failure has occurred in the internal clock unit 35, in addition to in the prior-to-data-processing time correction unit 32, the after-data-processing time correction unit 33, and the circuit or the functional block that performs packet processing for synchronizing packets.

Fourth Embodiment

Next, a configuration example of a relay apparatus 30 according to a fourth embodiment of the present disclosure is explained with reference to FIG. 11. The relay apparatus 30 shown in FIG. 11 includes an additional frequency reproduction unit 38 compared to the relay apparatus 30 shown in FIG. 10. Detailed explanations of components of the relay apparatus 30 shown in FIG. 11 that are similar to those of the relay apparatus 30 shown in FIG. 10 are omitted.

The frequency reproduction unit 38 reproduces a frequency used in the Master apparatus 40 by using a synchronizing packet transmitted from the Master apparatus 40. Specifically, the frequency reproduction unit 38 reproduces the frequency by using a method specified in IEEE1588 or IEEE1588Version2 (hereinafter referred to as IEEE1588). For example, the frequency reproduction unit 38 reproduces the frequency by using information on intervals between receptions of synchronization information (packet data) transmitted according to the IEEE1588 method. When IEEE1588-2008, for example, is applied to the relay apparatus 30, the receiving interval information is an Interval of received packet specified in the IEEE1588-2008. Instead of using the IEEE1588 method, an ACR (AdaptiveClockRecovery) specified in ITU-T G.8265.1 or the like may be used for the reproduction of a frequency using receiving interval information.

Further, the receiving interval of packet data may vary among a plurality of packet data due to a congestion state or the like of the network. In such a case, the receiving interval of packet data may be calculated by statistically analyzing receiving intervals over a plurality of packet data. For example, an average value of a plurality of receiving intervals may be calculated. Alternatively, a median of a plurality of receiving intervals may be calculated.

The frequency reproduction unit 38 outputs the reproduced frequency information to the internal clock unit 37. The internal clock unit 37 generates a clock signal based on the frequency information output from the frequency reproduction unit 38. That is, the internal clock unit 37 generates a clock signal that is synchronized with the frequency information output from the frequency reproduction unit 38. The internal clock unit 37 outputs a counter value that has been incremented according to clock timings determined based on the frequency information output from the frequency reproduction unit 38 to the determination unit 36.

As explained above, the internal clock unit 37 can reproduce the frequency used in the Master apparatus 40 by using a synchronizing packet transmitted from the Master apparatus 40. In this way, the internal clock unit 37 can achieve accuracy comparable to that of the clock in the Master apparatus 40. Since the internal clock unit 37 synchronizes its frequency with the frequency used in the Master apparatus 40, it is unnecessary to use a highly-accurate clock generation device, thus making it possible to reduce the cost of the relay apparatus 30.

Fifth Embodiment

Figure 12:
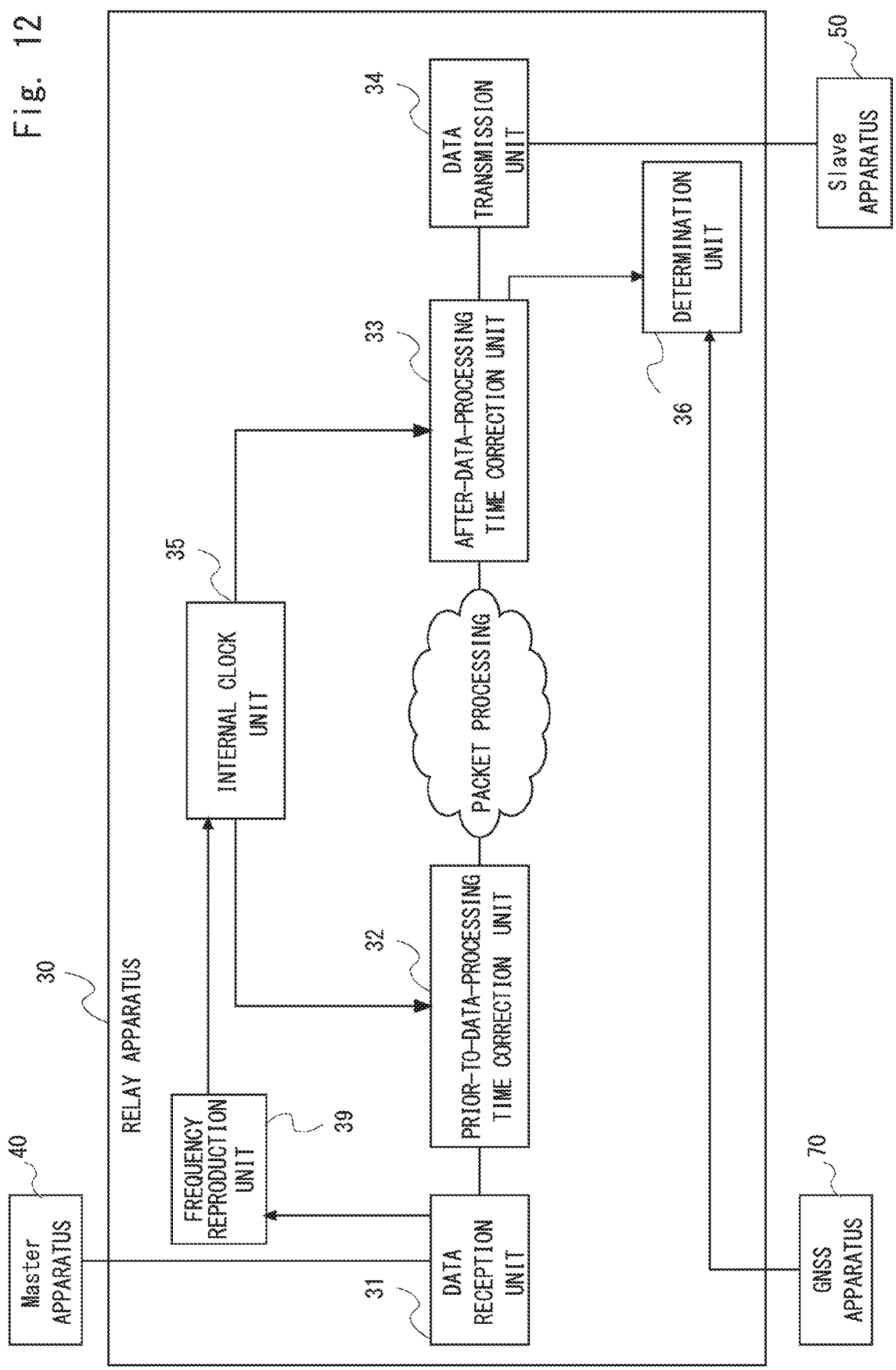
FIG. 12 is a configuration diagram of a relay apparatus according to a fifth embodiment.

Next, a configuration example of a relay apparatus 30 according to a fifth embodiment of the present disclosure is explained with reference to FIG. 12. The relay apparatus 30 shown in FIG. 12 includes an additional frequency reproduction unit 39 compared to the relay apparatus 30 shown in FIG. 3.

Figure 11:
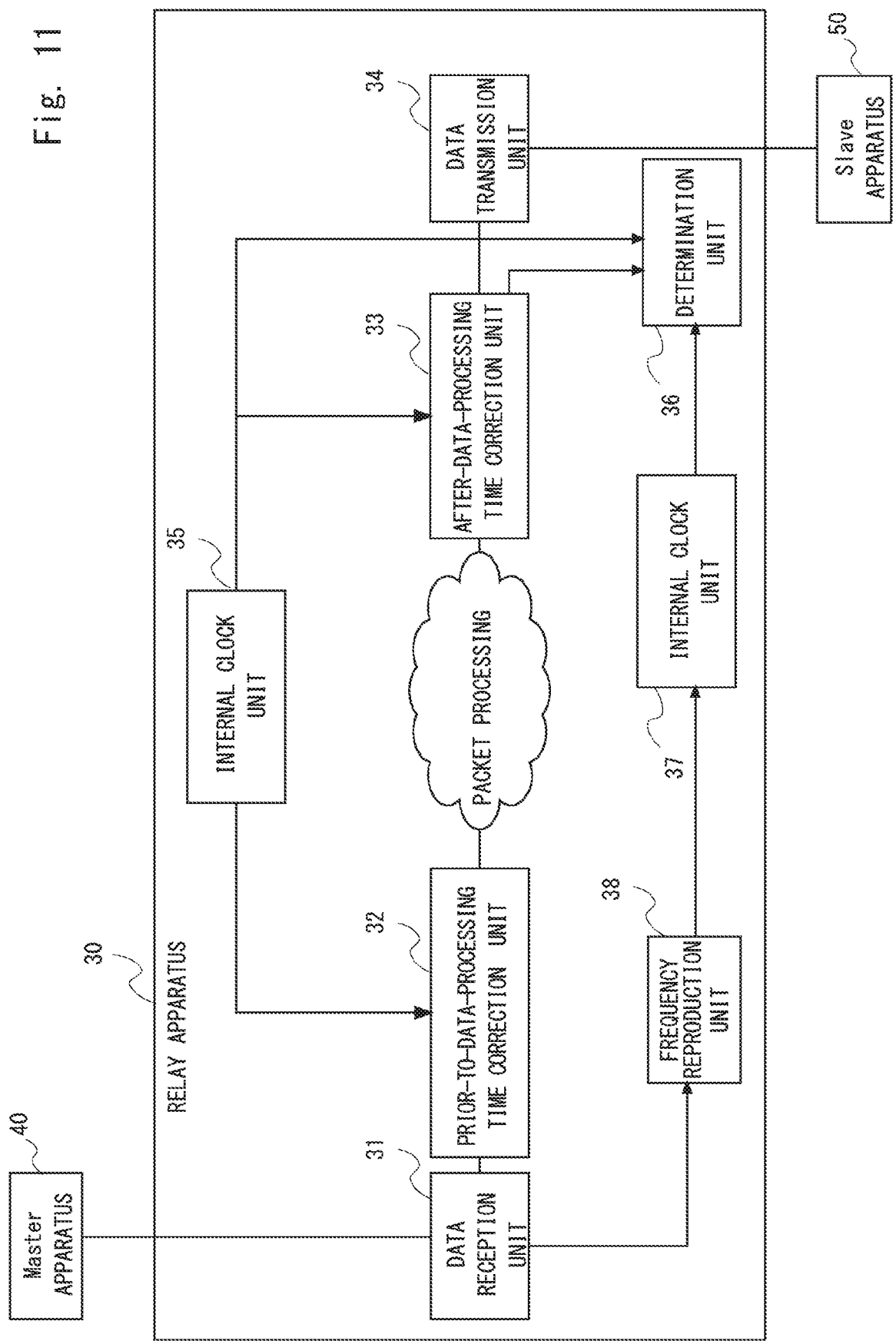
FIG. 11 is a configuration diagram of a relay apparatus according to a fourth embodiment.

Similarly to the frequency reproduction unit 38 shown in FIG. 11, the frequency reproduction unit 39 reproduces a frequency used in the Master apparatus 40 by using a synchronizing packet transmitted from the Master apparatus 40. The frequency reproduction unit 39 outputs the reproduced frequency information to the internal clock unit 35. The internal clock unit 35 generates a clock signal based on the frequency information output from the frequency reproduction unit 39. That is, the internal clock unit 35 generates a clock signal that is synchronized with the frequency information output from the frequency reproduction unit 39. The internal clock unit 35 outputs a counter value that has been incremented according to clock timings determined based on the frequency information output from the frequency reproduction unit 39 to the prior-to-data-processing time correction unit 32 and the after-data-processing time correction unit 33.

In this way, the internal clock unit 35 generates a clock signal that is synchronized with the clock signal in the Master apparatus 40.

Further, the determination unit 36 receives a clock signal transmitted from a GNSS apparatus 70 disposed outside the relay apparatus 30, instead of receiving a clock signal from the internal clock unit 35. In this way, assuming that the GNSS apparatus 70 is properly operating, the determination unit 36 can detect a failure in the Master apparatus 40 and a failure in a communication line between the Master apparatus 40 and the relay apparatus 30, in addition to a failure in the prior-to-data-processing time correction unit 32, the after-data-processing time correction unit 33, the circuit or the functional block that performs packet processing for synchronizing packets, and the internal clock unit 35.

As explained above, the relay apparatus 30 shown in FIG. 12 can detect a failure in the Master apparatus 40 and a failure in the communication line between the Master apparatus 40 and the relay apparatus 30, in addition to a failure that occurs inside the relay apparatus 30.

Sixth Embodiment

Figure 13:
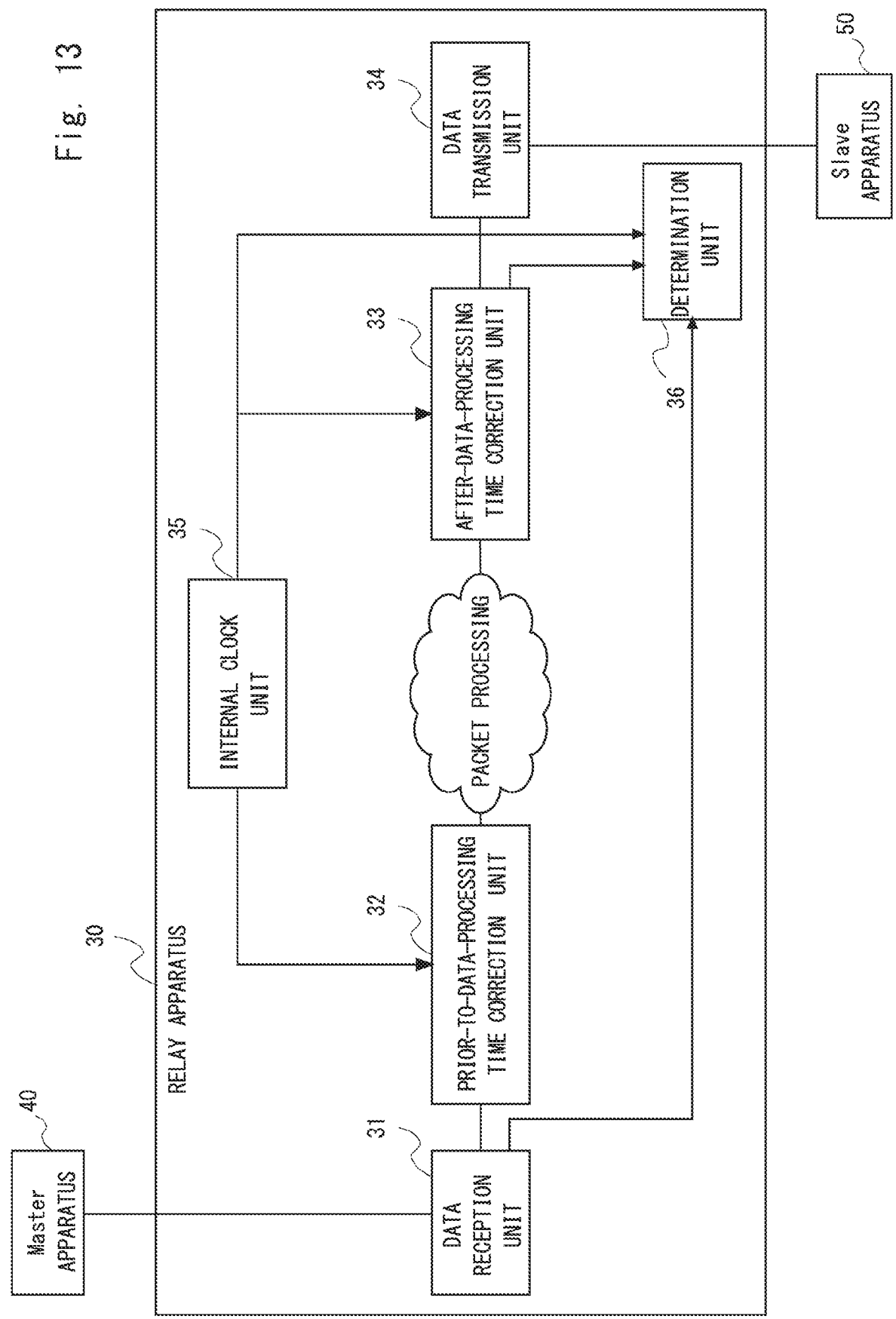
FIG. 13 is a configuration diagram of a relay apparatus according to a sixth embodiment.

Next, a configuration example of a relay apparatus 30 according to a sixth embodiment of the present disclosure is explained with reference to FIG. 13. In the relay apparatus 30 shown in FIG. 13, the determination unit 36 receives a synchronizing packet output from the data reception unit 31.

That is, the determination unit 36 receives a synchronizing packet whose time correction value has not been updated yet in the prior-to-data-processing time correction unit 32 and the after-data-processing time correction unit 33. The determination unit 36 manages a time value set in a time field in the synchronizing packet and an internal time value indicating a timing at which it receives the synchronizing packet output from the data reception unit 31 while associating them with each other. The internal time value is determined based on a clock signal output from the internal clock unit 35.

The determination unit 36 determines whether or not a difference (Ti−TL) between the time value (Ti) set in the time field of the synchronizing packet and the internal time value (TL) satisfies a condition that "(Ti−TL<Upper limit value) and (Ti−TL>Lower limit value)". When the determination unit 36 determines that the difference does not satisfy the condition that "(Ti−TL<Upper limit value) and (Ti−TL>Lower limit value)", it determines that a failure has occurred in the Master apparatus 40 or in a communication line between the Master apparatus 40 and the relay apparatus 30.

As explained above, the relay apparatus 30 shown in FIG. 13 can determine whether or not a failure has occurred outside the relay apparatus 30 by using a synchronizing packet whose time correction field has not been updated yet. Further, the determination unit 36 can determine whether or not there is an occurrence of a failure by using a synchronizing packet whose time correction field has already been updated. In this way, the relay apparatus 30 shown in FIG. 13 can determine whether or not there is an occurrence of a failure inside the relay apparatus 30 and outside the relay apparatus 30.

Seventh Embodiment

Figure 14:
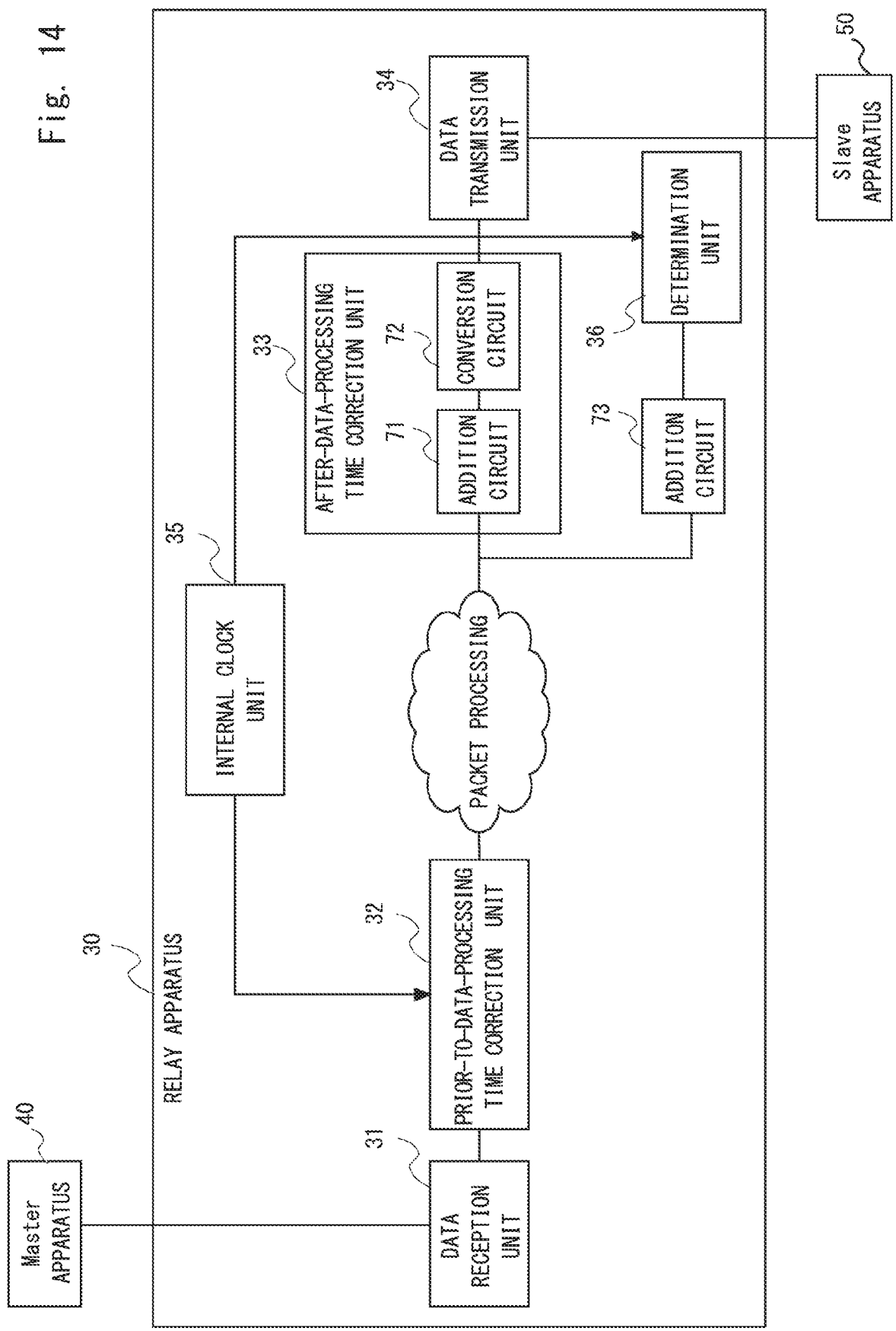
FIG. 14 is a configuration diagram of a relay apparatus according to a seventh embodiment.

Next, a configuration example of a relay apparatus 30 according to a seventh embodiment of the present disclosure is explained with reference to FIG. 14. FIG. 14 shows that the after-data-processing time correction unit 33 is formed by using one hardware component. The hardware component is, for example, an IC chip or the like. An addition circuit 71 and a conversion circuit 72 are disposed in the IC chip which constitutes the after-data-processing time correction unit 33.

The addition circuit 71 adds a value Tb to the value of the time correction field of the synchronizing packet. The conversion circuit 72 converts a MAC frame output from the addition circuit 71 into a physical signal. The physical signal is a signal transmitted through a transmission medium that is used to transmit data from the data transmission unit 34 to the Slave apparatus 50.

In general, in the case in which the addition circuit 71 and the conversion circuit 72 are formed by using one IC chip, when a MAC frame output from the addition circuit 71 is output to the determination unit 36, it is necessary to change the configuration of the IC chip. Therefore, the IC chip constituting the after-data-processing time correction unit 33 is not changed and an addition circuit 73 is provided in an IC chip different from the IC chip for the after-data-processing time correction unit 33. Further, the same data that is input to the addition circuit 71 is input to the addition circuit 73. The determination unit 36 determines whether or not there is an occurrence of a failure by using a synchronizing packet whose time correction field is updated in the addition circuit 73.

As explained above, the determination unit 36 shown in FIG. 14 can determine whether or not there is an occurrence of a failure by using a synchronizing packet output from the addition circuit 73 that is disposed in hardware different from the hardware constituting the after-data-processing time correction unit 33. In this way, even when the after-data-processing time correction unit 33 has been already constructed by using one hardware component, it is possible to perform a determination process using the determination unit 36 without changing the after-data-processing time correction unit 33.

Figure 15:
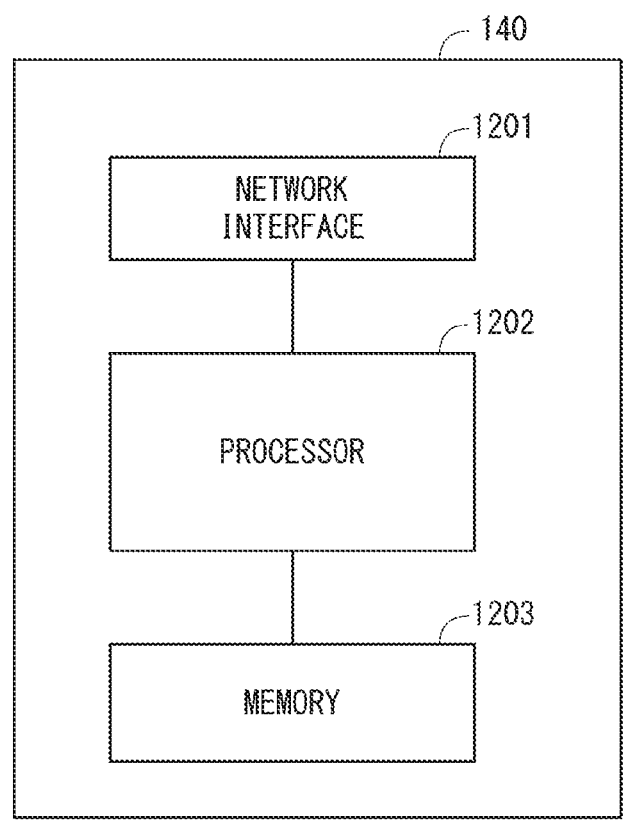
FIG. 15 is a configuration diagram of a relay apparatus according to each embodiment.

Next, a configuration example of the relay apparatus 10 and the relay apparatus 30 explained in the above-described plurality of embodiments is explained hereinafter with reference to FIG. 15. FIG. 15 is a block diagram showing a configuration example of a node apparatus 140. The node apparatus 140 shows a configuration example of the relay apparatus 10 and the relay apparatus 30. As shown in FIG. 15, the node apparatus 140 includes a network interface 1201, a processor 1202, and a memory 1203. The network interface 1201 is used for communication with other network node apparatuses constituting a communication system. The network interface 1201 may include, for example, a network interface card (NIC) in conformity with IEEE 802.3 series.

The processor 1202 performs processes performed by the node apparatus 140 explained with reference to the sequence diagrams and the flowcharts in the above-described embodiments by loading a software module from the memory 1203 and executing the loaded software module. The processor 1202 may be, for example, a microprocessor, an MPU, a CPU, a DSP, or an FPGA. The processor 1202 may include a plurality of processors.

The memory 1203 is formed by a combination of a volatile memory and a nonvolatile memory. The memory 1203 may include a storage disposed apart from the processor 1202. In this case, the processor 1202 may access the memory 1203 through an I/O interface (not shown).

In the example shown in FIG. 15, the memory 1203 is used to store a group of software modules. The processor 1202 can perform processes performed by the node apparatus 140 explained in the above-described embodiments by loading the group of software modules from the memory 1203 and executing the loaded software modules.

As explained above with reference to FIG. 15, each of the processors included in the relay apparatus 10 and the relay apparatus 30 executes one or a plurality of programs including a group of instructions to cause a computer to perform an algorithm explained above with reference to the drawings.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described embodiments and can be modified as appropriate without departing from the spirit and scope of the present disclosure.

Although the present disclosure is explained above with reference to embodiments, the present disclosure is not limited to the above-described embodiments. Various modifications that can be understood by those skilled in the art can be made to the configuration and details of the present disclosure within the scope of the present disclosure.

The whole or part of the embodiments disclosed above can be described as, but not limited to, the following supplementary notes.

(Supplementary Note 1)

A relay apparatus comprising:

a data reception unit configured to receive a synchronizing packet transmitted from a master apparatus, the synchronizing packet containing a time value and a time correction value for correcting the time value;

an update unit configured to update the time correction value based on a processing time for the synchronizing packet; and a determination unit configured to determine whether or not a failure has occurred in a functional block related to a process for updating the time correction value by using a result of a comparison between a corrected time value and a reference time value, the corrected time value having been corrected by using the updated time correction value.

(Supplementary Note 2)

The relay apparatus described in Supplementary note 1, wherein when the determination unit successively receives a plurality of synchronizing packets in each of which the time correction value has been updated and a difference between the corrected time value in a first synchronizing packet included in the plurality of synchronizing packets and a reference time value indicating a time at which the first synchronizing packet is received exceeds a predetermined threshold, the determination unit determines that a failure has occurred in the functional block related to the process for updating the time correction value.

(Supplementary Note 3)

The relay apparatus described in Supplementary note 1 or 2, further comprising a clock unit configured to supply an internal time to the update unit and the determination unit, wherein the determination unit uses an internal time value at which the synchronizing packet in which the time correction value has been updated is received as the reference time value.

(Supplementary Note 4)

The relay apparatus described in Supplementary note 1 or 2, further comprising:

a first clock unit configured to supply an internal time to the update unit; and a second clock unit configured to supply an internal time to the determination unit, the second clock unit being different from the first clock unit, wherein the determination unit uses an internal time value at which the synchronizing packet in which the time correction value has been updated is received as the reference time value.

(Supplementary Note 5)

The relay apparatus described in Supplementary note 1 or 2, further comprising:

a first clock unit configured to supply an internal time to the update unit, wherein the determination unit determines a time at which the synchronizing packet in which the time correction value has been updated is received by using an internal time value supplied from outside of the relay apparatus, and uses the internal time value supplied from outside of the relay apparatus as the reference time value.

(Supplementary Note 6)

The relay apparatus described in Supplementary note 5, wherein the internal time value supplied from outside of the relay apparatus is determined based on a frequency reproduced by using the synchronizing packet transmitted through a physical layer.

(Supplementary Note 7)

The relay apparatus described in Supplementary note 1 or 2, further comprising:

a first update unit configured to update the time correction value based on a processing time for the synchronizing packet;

a data transmission unit configured to transmit the synchronizing packet output from the first update unit to a slave apparatus; and a second update unit configured to update the time correction value based on the processing time for the synchronizing packet, the second update unit being disposed in a hardware circuit different from a hardware circuit including the first update unit, wherein the determination unit determines whether or not a failure has occurred in the functional block related to the process for updating the time correction value by using a result of a comparison between a corrected time value and a reference time value, the corrected time value having been corrected by using a time correction value updated in the second update unit.

(Supplementary Note 8)

The relay apparatus described in any one of Supplementary notes 1 to 7, wherein the update unit updates the time correction value by subtracting a reception time value indicating a time at which the synchronizing packet is received in the data reception unit from the time correction value and then adding an after-processing time value indicating a time later than a time of processing for the synchronizing packet to the resultant time correction value.

(Supplementary Note 9)

The relay apparatus described in any one of Supplementary notes 1 to 8, wherein when the determination unit determines that a failure has occurred in the functional block related to the process for updating the time correction value, it transmits a result of the determination to an apparatus different from the relay apparatus.

(Supplementary Note 10)

The relay apparatus described in any one of Supplementary notes 1 to 8, wherein when the determination unit determines that a failure has occurred in the functional block related to the process for updating the time correction value, it outputs a result of the determination to at least one of a display unit configured to display the result of the determination and a sound output unit configured to output a sound indicating the result of the determination.

(Supplementary Note 11)

A relay apparatus comprising:

a data reception unit configured to receive a synchronizing packet transmitted from a master apparatus, the synchronizing packet containing a time value and a time correction value for correcting the time value;

an update unit configured to update the time correction value based on a processing time for the synchronizing packet; and a verification unit configured to verify whether or not the time correction value is normal.

(Supplementary Note 12)

A communication system comprising:
  a master apparatus configured to transmit a synchronizing packet containing a time value and a time correction value for correcting the time value;
  a secondary apparatus configured to reproduce a time value synchronized with the time value indicated by the master apparatus by using the synchronizing packet; and
  a relay apparatus configured to relay the synchronizing packet transmitted/received between the master apparatus and the secondary apparatus, wherein
    the relay apparatus comprises:
    a data reception unit configured to receive the synchronizing packet transmitted from the master apparatus;
    an update unit configured to update the time correction value based on a processing time for the synchronizing packet; and
    a determination unit configured to determine whether or not a failure has occurred in a functional block related to a process for updating the time correction value by using a result of a comparison between a corrected time value and a reference time value, the corrected time value having been corrected by using the updated time correction value.

(Supplementary Note 13)

A failure detection method comprising:
  receiving a synchronizing packet transmitted from a master apparatus, the synchronizing packet containing a time value and a time correction value for correcting the time value;
  updating the time correction value based on a processing time for the synchronizing packet; and
  determining whether or not a failure has occurred in a functional block related to a process for updating the time correction value by using a result of a comparison between a corrected time value and a reference time value, the corrected time value having been corrected by using the updated time correction value.

REFERENCE SIGNS LIST

10 RELAY APPARATUS
11 DATA RECEPTION UNIT
12 UPDATE UNIT
13 DETERMINATION UNIT
20 MASTER APPARATUS
30 RELAY APPARATUS
31 DATA RECEPTION UNIT
32 PRIOR-TO-DATA-PROCESSING TIME CORRECTION UNIT
33 AFTER-DATA-PROCESSING TIME CORRECTION UNIT
34 DATA TRANSMISSION UNIT
35 INTERNAL CLOCK UNIT
36 DETERMINATION UNIT
37 INTERNAL CLOCK UNIT
38 FREQUENCY REPRODUCTION UNIT
39 FREQUENCY REPRODUCTION UNIT
40 Master APPARATUS
50 Slave APPARATUS
60 GNSS SATELLITE
62 GNSS RECEIVER
71 ADDITION CIRCUIT
72 CONVERSION CIRCUIT
73 ADDITION CIRCUIT

The invention claimed is:

1. A relay apparatus comprising:
  hardware including a processor and a memory;
  a data reception unit implemented at least by the hardware and configured to receive a synchronizing packet transmitted from a master apparatus, the synchronizing packet containing a time value and a time correction value for correcting the time value;
  a first update unit implemented at least by the hardware and configured to update the time correction value based on a processing time of the synchronizing packet to generate a first time correction value;
  a second update unit implemented at least by the hardware and configured to update the time correction value based on the processing time for the synchronizing packet to generate a second time correction value, the second update unit being disposed in a hardware circuit different from a hardware circuit including the first update unit;
  a determination unit implemented at least by the hardware and configured to determine whether a failure has occurred in a functional block related to a process for updating the first time correction value by using a result of a comparison between a corrected time value and a reference time value, the corrected time value having been corrected by using the first time correction value;
  a first clock unit implemented at least by the hardware and configured to supply a first internal time to the first update unit;
  a second clock unit implemented at least by the hardware and configured to supply a second internal time to the determination unit; and
  a data transmission unit implemented at least by the hardware and configured to transmit the synchronizing packet output from the first update unit to a slave apparatus,
  wherein the second clock unit is different from the first clock unit,
  wherein the first update unit is further configured to update the first internal time based on the processing time of the synchronizing packet and transmit the first internal time to the determination unit, and
  wherein the determination unit is further configured to:
    use an internal time value of the first internal time at which the synchronizing packet is received, as the reference time value; and
    determine whether the failure has occurred in the functional block related to the process for updating the second time correction value by using a result of a comparison between the corrected time value and the reference time value, the corrected time value having been corrected by using the second time correction value updated in the second update unit.

2. The relay apparatus according to claim 1, wherein when the determination unit successively receives a plurality of synchronizing packets in each of which the first time correction value has been updated and a difference between the corrected time value in a first synchronizing packet included in the plurality of synchronizing packets and the reference time value indicating a time at which the first synchronizing packet is received exceeds a predetermined threshold, the determination unit determines that the failure has occurred in the functional block related to the process for updating the first time correction value.

3. The relay apparatus according to claim 1, wherein the determination unit determines a time at which the synchronizing packet in which the time correction value has been updated is received by using the internal time value supplied from outside of the relay apparatus, and uses the internal time value supplied from outside of the relay apparatus as the reference time value.

4. The relay apparatus according to claim 3, wherein the internal time value supplied from outside of the relay apparatus is determined based on a frequency reproduced by using the synchronizing packet transmitted through a physical layer.

5. The relay apparatus according to claim 1, wherein the first update unit updates the first time correction value by subtracting a reception time value indicating a time at which the synchronizing packet is received in the data reception unit from the time correction value and then adding an after-processing time value indicating a time later than a time of processing for the synchronizing packet to a resultant time correction value.

6. The relay apparatus according to claim 1, wherein when the determination unit determines that the failure has occurred in the functional block related to the process for updating the first time correction value, the determination unit transmits a result of the determination to an apparatus different from the relay apparatus.

7. The relay apparatus according to claim 1, wherein when the determination unit determines that the failure has occurred in the functional block related to the process for updating the first time correction value, it outputs a result of the determination to at least one of display unit for displaying the result of the determination and sound output unit for outputting a sound indicating the result of the determination.

8. A communication system comprising:
a master apparatus configured to transmit a synchronizing packet containing a time value and a time correction value for correcting the time value;
a secondary apparatus configured to reproduce a time value synchronized with the time value indicated by the master apparatus by using the synchronizing packet; and
a relay apparatus configured to relay the synchronizing packet transmitted/received between the master apparatus and the secondary apparatus, wherein
the relay apparatus comprises:
hardware including a processor and a memory;
a data reception unit implemented at least by the hardware and configured to receive the synchronizing packet transmitted from the master apparatus;
a first update unit implemented at least by the hardware and configured to update the time correction value based on a processing time of the synchronizing packet to generate a first time correction value;
a second update unit implemented at least by the hardware and configured to update the time correction value based on the processing time for the synchronizing packet to generate a second time correction value, the second update unit being disposed in a hardware circuit different from a hardware circuit including the first update unit;
a determination unit implemented at least by the hardware and configured to determine whether a failure has occurred in a functional block related to a process for updating the first time correction value by using a result of a comparison between a corrected time value and a reference time value, the corrected time value having been corrected by using the first time correction value;
a first clock unit implemented at least by the hardware and configured to supply a first internal time to the first update unit;
a second clock unit implemented at least by the hardware and configured to supply a second internal time to the determination unit; and
a data transmission unit implemented at least by the hardware and configured to transmit the synchronizing packet output from the first update unit to a slave apparatus,
wherein the second clock unit is different from the first clock unit,
wherein the first update unit is further configured to update the first internal time based on the processing time of the synchronizing packet and transmit the first internal time to the determination unit, and
wherein the determination unit is further configured to:
use an internal time value of the first internal time at which the synchronizing packet is received, as the reference time value; and
determine whether the failure has occurred in the functional block related to the process for updating the second time correction value by using a result of a comparison between the corrected time value and the reference time value, the corrected time value having been corrected by using the second time correction value updated in the second update unit.

9. A failure detection method comprising:
receiving, by a data reception unit, a synchronizing packet transmitted from a master apparatus, the synchronizing packet containing a time value and a time correction value for correcting the time value;
first updating, by a first update unit, the time correction value based on a processing time for the synchronizing packet to generate a first time correction value;
second updating, by a second update unit, the time correction value based on the processing time for the synchronizing packet to generate a second time correction value, the second update unit being disposed in a hardware circuit different from a hardware circuit including the first update unit;
determining, by a determination unit, whether or not a failure has occurred in a functional block related to a process for updating the first time correction value by using a result of a comparison between a corrected time value and a reference time value, the corrected time value having been corrected by using the first time correction value;
supplying, by a first clock unit, a first internal time to the first update unit;
supplying, by a second clock unit, a second internal time to the determination unit; and
transmitting, by a data transmission unit, the synchronizing packet output from the first updating unit to a slave apparatus,
wherein the second clock unit is different from the first clock unit,
wherein the first updating further comprises updating the internal time based on the processing time of the synchronizing packet and transmitting the first internal time to the determination unit, and
wherein the determining further comprises:
using an internal time value of the first internal time at which the synchronizing packet is received, as the reference time value; and
determining whether the failure has occurred in the functional block related to the process for updating the second time correction value by using a result of a comparison between the corrected time value and the reference time value, the corrected time value having been corrected by using the second time correction value updated in the second update unit.

* * * * *